Dec. 23, 1930.    C. H. VOGT    1,786,372
FOOD PRODUCT AND METHOD OF MARKETING THE SAME
Filed Jan. 25, 1928
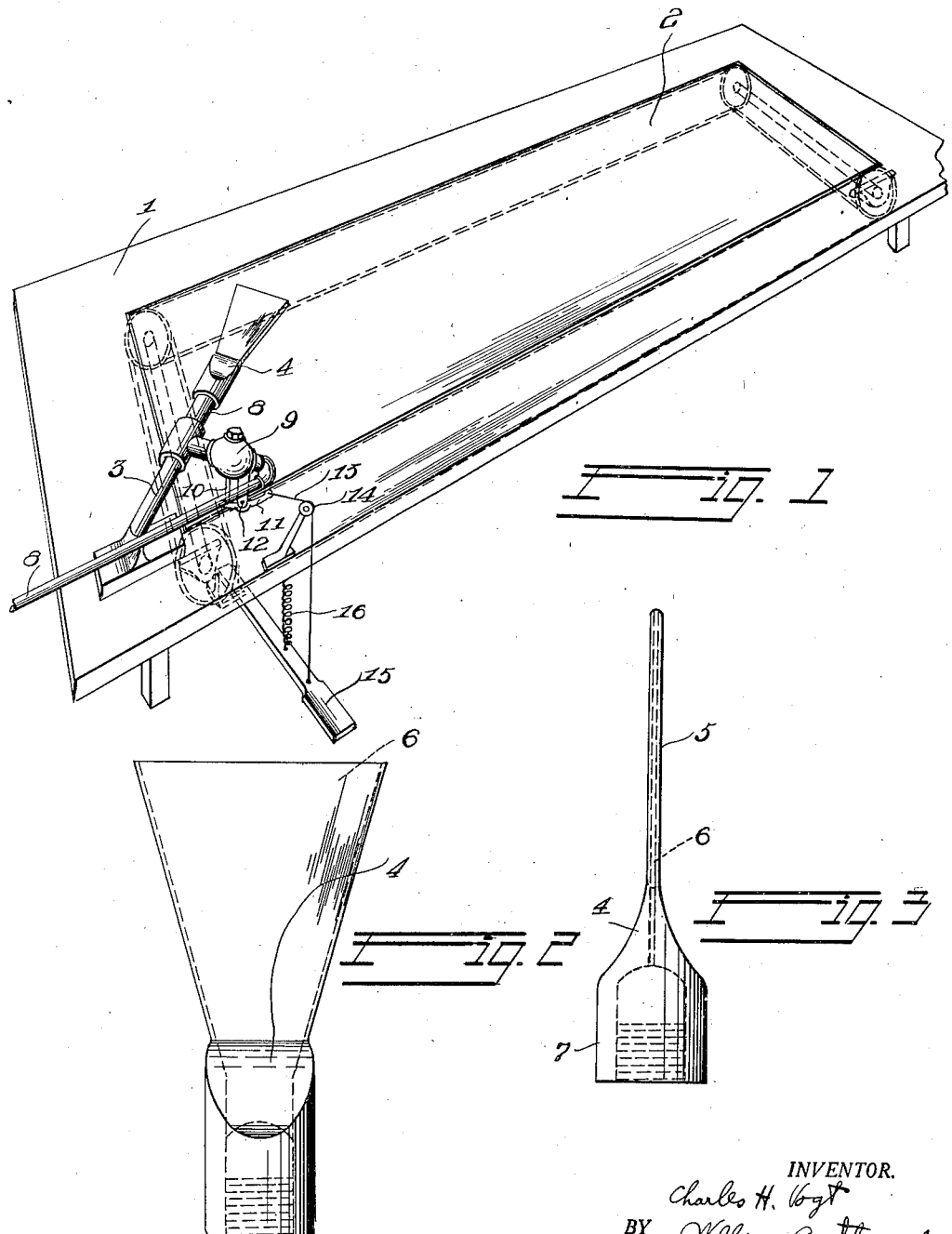
INVENTOR.
Charles H. Vogt
BY William A. Strauch
ATTORNEYS.

Patented Dec. 23, 1930

1,786,372

UNITED STATES PATENT OFFICE

CHARLES H. VOGT, OF PHILADELPHIA, PENNSYLVANIA

FOOD PRODUCT AND METHOD OF MARKETING THE SAME

Application filed January 25, 1928. Serial No. 249,304.

This invention relates to food products, and methods of marketing the same. More particularly the invention relates to food products commonly manufactured in pans such as scrapple, meat loaf, and pan baked cakes, bread, and the like, and has been especially developed for the production of the edible and nutritious food product commonly termed scrapple, and to provide a sanitary, novel method of marketing scrapple and pan formed loaf products.

The food product known as scrapple is most commonly formed by introducing a comminuted mixture of cooked pork, a small quantity of liver, if desired, into water heated to the boiling point, adding corn meal gradually thereto in an amount sufficient to thicken the mass, and if necessary also a small amount of rye or buckwheat flour, cooking the mass, pouring the cooked mixture into forming receptacles as tin pans of comparatively large size and shape so as to form a loaf, and allowing the mixture to cool and set to a solidified mass. The product thus produced has heretofore been sold to the trade in the forming receptacles or pans, being cut from the pans into pieces of a size demanded by the individual purchasers.

The loaves of scrapple produced by this method are satisfactory as regards their marketability only if they are sold to the ultimate consumer within a short period of time after they have been made. If not disposed of within a few days after they have been made, the scrapple loaves undergo a marked change in appearance and color, due to the decomposition of the meat forming a part of the scrapple mixture. This decomposition is probably the result of oxidation and bacterial action caused by the bacteria associated with or present in the scrapple loaves. Some of the bacteria causing this deleterious action are apparently normally present in the atmosphere, and are transferred to the scrapple loaves in the course of manufacture through handling by the workers, contact with their clothing and the like. Exhaustive tests and isolation of cultures of bacteria that are present in deteriorating meat indicate that aerobic bacteria of the species known as "spherical organisms" whose growth is inhibited by the presence of light and absence of oxygen and moisture, cause a substantial decomposing action.

Scrapple as manufactured is ordinarily removed from the pans with considerable difficulty and it has been the practice to cut the loaf from the pans, exposing it to atmosphere and cutting the pieces from large sized loaves in quantities that are demanded by the purchaser. The loaves cut in this way are exposed to contamination in the atmosphere, are roughly cut furnishing excellent breeding grounds of the entry of deleterious bacteria, and decomposing oxidation in the cut broken and roughened surfaces, and the product is very unappetizing in appearance, and cannot be properly marked or branded to indicate its origin, so that it is impossible for the purchaser to be sure of the quality of the product or its maker, and as a result the market for scrapple has in the past suffered materially.

Various attempts have been made to overcome the adverse conditions surrounding the marketing of scrapple and destructive action of the scrapple loaves by encasing or enclosing pieces of the scrapple loaves of measured weight individually in containers or wrappers, but the cost of handling the product in this way is prohibitive, while in the handling and cutting contamination was initiated due to inoculation of the product with decomposing bacteria whose activity was augmented and encouraged by the exclusion of light and encasing in wrappers with moisture on the surface of the product and air in spaces between the wrapper and the product, resulting in rapid deterioration of the product. Another method that has been tried unsuccessfully consisted in pouring the hot scrapple mixture into bags of parchment paper, allowing the mixture to cool and set to a gel-like mass, and then enclosing same in a paper carton or receptacle to avoid the difficulties involved in removing the scrapple from the pans encountered in the prior processes.

Encasing the scrapple loaves individually in wrappers of parchment paper or forming the scrapple loaves in parchment bags and enclosing the loaves thus formed in paper boxes was also found to be commercially non-feasible as the paper absorbed and held not only the moisture deposited by condensation about the exterior surface of the loaf but also the greases contained in the scrapple loaf, thereby causing the paper to adhere to the loaf and giving it an unappetizing and unsightly appearance. The moisture about the surface of the loaf reacted with certain of the waxed paper coverings forming reaction products which were in turn deposited upon the loaf, resulting in the contamination of the loaf. These reaction products resulted from the action of the sizing contained in the paper with the moisture about the exterior surface of the scrapple loaf.

I have discovered that it is possible to remove scrapple, meat loaf, cake and the like from pans to which they tend to adhere without mutilation and breaking the grain or structure of the loaves by use of compressed air or gas in such manner that small sized loaves may be economically produced and handled at sufficiently low cost to permit the production of one and two pound scrapple loaves in commercially profitable manner. I have further discovered that the loaves as they come from the pans when removed in this way are covered on the bottom and sides with a smooth edible fatty protein coating of gel-like nature that acts as a protection against decomposition and bacterial attack due to its smooth nature which aids materially in imparting keeping qualities to the product, and I have found that by applying a protective coating of grease on top of the loaves before they are removed from the pan an attractive scrapple loaf of highly improved keeping qualities, appearance and esthetic appeal is provided. As heretofore removed from the pans the protecting smooth film or coating on the scrapple noted on my improved product has adhered to the pans and been cut from the scrapple loaf.

In this way I have produced a novel scrapple loaf of an attractive marketable size which will not suffer substantial deterioration over comparatively long periods. I have further found that by maintaining the temperature of the scrapple above 194 degrees Fahrenheit until the coating of grease is applied to the top of the loaves, a comparatively sterile loaf is provided which may be chilled and wrapped in sterile condition while chilled due to the inhibiting action of the chilling on bacterial growth and decomposition and a high grade wrapped product of markedly improved keeping qualities and marketability is provided. The wrappers used for this purpose are preferably of a material that is transparent, substantially impervious to moisture, resistant to the action of greases and meat juices, light in weight, firm, and should be of such nature as to adhere closely to the outer smooth and greasy surface of the scrapple to exclude the atmosphere and substantially seal same against the influences of the atmosphere without the necessity for the use of special sealing means. A wrapper that has been found especially satisfactory is that marketed under the trade name "cellophane".

Accordingly one object of my invention is the production of scrapple in loaf form that may be marketed widely in uncut form, and will retain an attractive appearance over a long period of time.

Another object of the invention is the production of scrapple in a whole uncut loaf form encased or enclosed in a thin, transparent wrapper which is impervious to moisture, and resistant to the action of greases contained in the scrapple loaf.

A further object of the invention resides in the process for making scrapple in loaf form wherein the scrapple mixture is introduced into the forming receptacle at a temperature above the death point of certain contaminating bacteria apparently causing rapid deterioration of the ordinary scrapple loaf.

A still further object of the invention resides in a novel method and apparatus for removing scrapple, meat loaf, cake loaves and the like from forming receptacles or pans without mutilating the exterior surface of the formed loaf or destroying the grain of the loaf so that the loaf will be of improved appearance and keeping qualities and will more readily stand the jars and shocks incident to shipment.

A still further object of the invention resides in the process for making scrapple in loaf form and the product is branded in such manner that removal of the brand mark mutilates the product and makes the substitution of inferior grades of products difficult.

Other objects of the invention are such as will appear in the following detailed description and as are defined by the scope of the appended claims.

As shown in the drawings:

Figure 1 is a perspective view of a wrapping table and associated mechanism for removing scrapple meat, cake or similar loaves from the forming receptacles or pans.

Figure 2 is a side view of an air knife utilized in removing the loaves from the pans.

Figure 3 is an end view of the air knife.

Scrapple in loaf form may be produced in accordance with this invention by proceeding in the following manner. A scrapple mixture is formed by mixing together cooked pork and liver, preferably in the ratio of 400 pounds of pork to 50 pounds of liver. The mixture is then subjected to a disintegrating or chopping action, and comminuted to the desired degree. This comminuted mixture is then introduced into a receptacle or cooker containing water which has been heated to the boiling point or to a temperature of 212° F. Into this receptacle is then gradually added about 120 pounds of corn meal, and the mass vigorously agitated so that no lumps will form. It is sometimes desirable to also add a certain percentage of rye flour to bring the mass to the desired consistency. It is important that the mass be kept at the boiling point during the addition of the corn meal, and, if necessary, the rye flour is added thereto.

After the cooker has been charged, the mass is then cooked or boiled for about two hours, care being taken that the mass is boiling during the entire cooking period. At the expiration of the two hours, the cooking is discontinued, and the grease freed from the meat during the cooking which has collected upon the surface of the scrapple mixture is removed therefrom in any well known manner as by siphoning, skimming, or withdrawing the grease through pipes to a storage receptacle.

The scrapple mixture is then removed from the cooker into receptacles, wherein the scrapple mixture may be conveyed to a storage hopper which is in communication with the hopper of an automatic filling machine. The scrapple mixture in a heated condition is then automatically introduced by the filling machine in predetermined measured amounts into pans shaped to form the desired loaves. The temperature of the scrapple mixture when introduced into the forming receptacles or pans is preferably at a temperature of 194° F. or above, as this is the apparent death point of certain bacteria which cause the deterioration or decomposition of the meat products.

A measured quantity of the grease in melted state skimmed from the scrapple cookers is then poured over the top of the scrapple mixture contained in each pan in an amount sufficient to form a coating thereon when solidified. Preferably before the grease has solidified a label printed on parchment paper or other suitable material is placed on top of the grease in such manner that it will be retained in position in the center of the loaf by the grease when solidified. The parchment paper of which the labels are made should be of a grade that does not contain sizing of glue and resin present in cheaper grades of waxed paper, as such sizings are affected in undesirable manner by the scrapple. This method of branding the scrapple loaves gives the loaves an attractive appearance, and causes the label to stand out plainly in the center of the top of the loaf when the finished scrapple loaf is wrapped in a transparent wrapper.

It is to be noted that the scrapple mixture is introduced while hot into clean and sterile pans in order to form loaves of predetermined size and shape, and that the loaves thus formed are protected or sealed against the air by the coating of grease on the top thereof. Branding the scrapple loaves by applying a printed label to the grease before the grease has solidified causes the loaves to have an attractive appearance. The coating of rich yellow grease carrying a printed label upon the top of the smooth sided, uncut scrapple loaves viewed through a transparent wrapper causes the loaves to exert a strong esthetic appeal upon the purchasing public, and has widely increased the demand for my improved product.

The forming receptacles or pans containing the scrapple loaves carrying a coating of grease on the top thereof in which a printed label is preferably imbedded, are then placed upon shelves of suitable cages, and transferred to a cooling or chilling room maintained at a temperature of 38° F. to 40° F. The pans or receptacles are permitted to remain in the cooling room for about twelve hours during which the scrapple protected by the pans and the top coating sets into solid loaf form.

After the chilling operation, the cages in which are supported the receptacles or pans containing the formed scrapple loaves are conveyed to the wrapping table where the operator grasps a receptacle or pan from the cage, tilts same to an angle of about 45 degrees, and inserts a flat bladed air knife along one side of the receptacle or pan. As soon as the air knife has been pushed down along one side of the receptacle or pan, the operator depresses a treadle to open an air valve, and injects air under pressure between exterior surfaces of the scrapple loaf and the pan freeing the sides and bottom of the loaf from the pan. After the scrapple loaf has been loosened from the side walls of the receptacle, the operator drops the loaf bottom side up upon a wrapper made of a material which is transparent, impervious to moisture, and resistant to the action of greases as cellophane, placed in position upon the travelling belt of the wrapping table by an assistant stationed by the opposite side of the table. The loaf is then enclosed in the wrapper by a worker positioned along the wrapper table, who folds the wrapper closely around the loaf without touching it.

The grease surrounding the scrapple loaf is of such nature that the cellophane wrappers adhere closely thereto without the use of any stickers to the edges, substantially excluding air from between the loaf and the wrapper. As the loaves are wrapped in the chilling room immediately after being freed from the pans at temperatures which inhibit bacterial growth and prevent decomposition of moisture on the loaf due to condensation, the loaf is wrapped in dry sterile condition and the access of light through the transparent wrapper and exclusion of atmosphere inhibits growth of deleterious organisms and decomposing action of oxidation. As a result an attractive package of sanitary appearance in which the attractively coated, labeled and unmutilated scrapple loaf is visible to the purchaser, is provided.

The apparatus for removing the scrapple loaves from the forming receptacles and applying the wrappers thereto will now be described. This apparatus as shown in the drawings comprises a wrapping table 1 having an endless travelling belt 2. Disposed at an angle with respect to the table 1 and secured to a stand 3 adjacent one end of the said table is an air knife 4 having a flat rectangular shaped blade 5 in which a passage 6 for passage of air in a thin sheet out of the end of blade 5 is formed. Formed integrally with blade 5 is an internally threaded tubular shank or pocket 7 adapted to thread on the end of an air supply pipe line 8. Disposed in the air pipe line 8 is a valve 9 having a valve stem 10 actuated by one end of actuating lever 11 pivoted at 12 to an extension of valve 11. Attached to the opposite end of arm 11 is a wire or cord 13 which rides over the roller 14 suitably supported from the table 1 and is secured to one end of a foot treadle 15, by the action of spring 16.

In order to remove the scrapple or other loaf from the forming receptacle or pan the operator tilts the pan to an angle of about 45°, and inserts blade 5 between one side of the loaf and the side of the pan. The pan is then pushed downwardly by the operator so that one side thereof contacts with the blade, and the operator depresses treadle 15, operating wire 13 and arm 12 to open valve 11 permitting air under pressure to enter through the slit in the end of blade 5 formed by passage 6 between the loaf and the pan. The action of the air injected under pressure in this way between the exterior surface of the scrapple loaf and the pan loosens the loaf from the sidewalls of the pan as a whole, and without substantial breaks in the texture or exterior surface of the loaf. By removing scrapple loaves in this way in place of cutting the scrapple loaf loose by running a knife all the way around the sides of the receptacle and pounding the pans in an inverted position, as is customarily done, the grain or structure of the loaf is not destroyed or mutilated and the sides and bottom of the loaf are protected by the smooth coating above mentioned. When the loaf has been loosened the operator drops the loaf top downward centrally on a suitable rectangular piece of suitable wrapper such as "cellophane" placed in proper position underneath the knife on belt 2 by an assistant and the empty pan is removed. The loaf resting on the wrapper is conveyed along the table 1 by belt 2, is removed by other assistants and the rectangular wrapper is folded around the loaf without touching of the loaf. Owing to the special characteristics of the wrapper and my improved scrapple loaf the wrapper will adhere closely to the loaf excluding atmosphere and providing an attractive package without the necessity of using stickers or special sealing means.

The removal of the loaves of scrapple from the forming receptacles or pans as well as the wrapping is performed in the chilling room in order to eliminate as much as possible, condensation of the moisture about the surfaces of the scrapple loaves. In this way the scrapple loaves are wrapped in a substantially dry and sterile condition.

Although it is important that the outer surfaces of the scrapple loaves be substantially dry and sterile before the loaves are encased in wrappers in order to control or restrict the destructive action of bacteria, if any be present, it is also important that the wrappers utilized for such purpose be such that the material of which they are made is transparent, impervious to moisture, and resistant to the action of greases. The wrappers which are transparent have been selected in order to inhibit and prevent the propagation of destructive organisms or bacteria, if any be present, in the scrapple loaf, as it has been determined that such bacteria cannot thrive in the presence of light as well as for the esthetic appeal and to show the high grade nature of the enclosed product.

While a preferred process of producing scrapple loaves has been described, it will be apparent to those skilled in the art that other meat loaves, cakes, and food products manufactured in pans may be packaged and marketed in similar manner and that the details of the invention may be varied widely without departing from the scope thereof as defined by the appended claims. The novel scrapple package described in this application is being claimed in an application filed November 26, 1930, Serial Number 498,448.

Having thus described the invention, what is claimed as new and desired to be secured by Letters Patent is:

1. In the process of making scrapple, the steps which comprise introducing the scrapple mixture while hot into an imperforate molding receptacle, and removing the scrapple from the molding receptacle with a gaseous medium under pressure applied between the molded scrapple and a wall of said receptacle.

2. The method of removing an edible product from a pan to which it tends to adhere, which consists in injecting a stream of compressed air of relatively great width and small depth between the product and a wall of said pan so that the width of the stream extends parallel to said wall to free said product from said pan, whereby substantial mutilation of said product is avoided.

3. The process of preparing scrapple for the market, including the steps of introducing the scrapple mixture while hot into a molding receptacle, removing the scrapple from the molding receptacle in a manner to avoid breaking of the protective coating formed by contact of the scrapple with the walls of the mold, encasing the formed scrapple in a wrapper formed of a material which is impervious to moisture and resistant to the action of greases, and causing said wrapper to firmly adhere to the scrapple without the use of extraneous sealing means by pressing said wrapper into firm contact with the moist surface of the molded scrapple.

4. The process of preparing scrapple for the market, which comprises introducing the scrapple mixture while hot into a molding receptacle, applying hot grease to the top of the scrapple contained in said receptacle to seal the pores, removing the scrapple from the molding receptacle in a manner so as to avoid rupture of the coating formed around the molded scrapple by contact between the scrapple and the walls of the mold, and encasing the molded scrapple loaf in a wrapper formed of a material which is transparent, impervious to moisture, resistant to the action of greases, and firmly adherent to said scrapple when pressed in contact with said coating or with the grease applied to the top of said loaf.

5. The process of preparing scrapple for the market, which comprises introducing the scrapple mixture while hot into a molding receptacle, chilling the scrapple contained in said receptacle, removing the scrapple in a manner so as to avoid rupture of the coating formed by contact of the scrapple with the walls of the mold, and encasing the molded scrapple loaf in a wrapper impervious to moisture and resistant to the action of the greases.

6. The method of removing scrapple from a pan to which it adheres without rupturing the protective coating formed by contact of the scrapple with the walls of the pan, which comprises the step of causing a gaseous medium to enter between the bottom of the product and the pan under pressure in such manner that the scrapple is separated therefrom by the entrance of said medium between the coating and said walls.

In testimony whereof I affix my signature.

CHARLES H. VOGT.